(12) United States Patent
Weber (10) Patent No.: US 11,014,532 B2
(45) Date of Patent: May 25, 2021

(54) VEHICLE CONTROL MODULE FOR SMART HOME CONTROL SYSTEM

(71) Applicant: Gentex Corporation, Zeeland, MI (US)

(72) Inventor: Garrett D. Weber, Dorr, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/402,540

(22) Filed: May 3, 2019

(65) Prior Publication Data

US 2019/0344753 A1 Nov. 14, 2019

Related U.S. Application Data

(60) Provisional application No. 62/670,885, filed on May 14, 2018.

(51) Int. Cl.
*B60R 25/10* (2013.01)
*B60R 25/042* (2013.01)
*B60W 30/188* (2012.01)

(52) U.S. Cl.
CPC ......... *B60R 25/042* (2013.01); *B60W 30/188* (2013.01); *B60T 2220/02* (2013.01)

(58) Field of Classification Search
CPC . B60R 25/042; B60W 30/188; B60T 2220/02
See application file for complete search history.

(56) References Cited

U.S. PATENT DOCUMENTS

| | | | | |
|---|---|---|---|---|
| 6,028,537 A * | 2/2000 | Suman | ................... | B60K 35/00 340/988 |
| 7,219,123 B1 * | 5/2007 | Fiechter | ............ | H04M 1/72561 704/E15.045 |
| 8,643,481 B2 * | 2/2014 | Campbell | ................ | B60Q 3/80 340/438 |
| 9,288,270 B1 * | 3/2016 | Penilla | ................... | G06Q 10/02 |

(Continued)

FOREIGN PATENT DOCUMENTS

| | | |
|---|---|---|
| CN | 105446179 A | 3/2016 |
| WO | 2017107982 A1 | 6/2017 |

OTHER PUBLICATIONS

Butt et al., Privacy Management in Social Internet of Vehicles Review Challenges and Blockchain Based Solutions (Year: 2019).*

(Continued)

*Primary Examiner* — Quang Pham
(74) *Attorney, Agent, or Firm* — Price Heneveld LLP; Bradley D. Johnson (57) ABSTRACT

A control module for a vehicle comprises a wireless communication circuit in communication with a smart home device and a remote server. The control module further comprises a control circuit in communication with the wireless communication circuit and a controller of the vehicle via a bus interface. The control circuit is configured to receive a status request from the smart home device via the wireless communication circuit. Based on the status request, the control circuit requests a status identification from the controller according to the status request. The (Continued)

control circuit receives the status identification from the controller and communicates the status identification to the smart device via the wireless communication circuit. The status identification is announced by the smart home device.

10 Claims, 5 Drawing Sheets

(56) References Cited

U.S. PATENT DOCUMENTS

| | | | | |
|---|---|---|---|---|
| 9,344,849 B2* | 5/2016 | Snyder | H04W 4/025 |
| 9,463,807 B2* | 10/2016 | Mansur | B60W 20/17 |
| 10,310,505 B1* | 6/2019 | Hanson | G05D 1/0274 |
| 2006/0238316 A1* | 10/2006 | Taki | B60R 99/00 340/426.13 |
| 2008/0269958 A1* | 10/2008 | Filev | A61B 5/18 701/1 |
| 2010/0094496 A1* | 4/2010 | Hershkovitz | B60L 3/12 701/22 |
| 2010/0153207 A1* | 6/2010 | Roberts | G06Q 30/0266 705/14.41 |
| 2010/0211252 A1* | 8/2010 | Wang | G08B 21/22 701/31.4 |
| 2011/0313594 A1* | 12/2011 | Kato | G07C 5/008 701/2 |
| 2012/0095643 A1* | 4/2012 | Bose | B60K 37/00 701/32.8 |
| 2012/0101659 A1* | 4/2012 | Kim | B60L 53/60 701/2 |
| 2012/0116608 A1* | 5/2012 | Park | H04W 4/44 701/2 |
| 2012/0120930 A1* | 5/2012 | Ji | H04L 12/2825 370/338 |
| 2012/0245945 A1* | 9/2012 | Miyauchi | G10L 15/06 704/275 |
| 2012/0323763 A1* | 12/2012 | Michael | G06Q 30/0241 705/39 |
| 2012/0323767 A1* | 12/2012 | Michael | G06Q 40/00 705/39 |
| 2012/0323772 A1* | 12/2012 | Michael | G06Q 40/00 705/39 |
| 2013/0103200 A1* | 4/2013 | Tucker | G01C 21/20 700/275 |
| 2013/0144470 A1* | 6/2013 | Ricci | G06Q 30/0265 701/2 |
| 2013/0184970 A1* | 7/2013 | Kanafani | B60H 1/00314 701/103 |
| 2013/0185072 A1* | 7/2013 | Huang | G10L 15/01 704/246 |
| 2014/0107891 A1* | 4/2014 | Choi | G06F 7/00 701/36 |
| 2014/0170515 A1* | 6/2014 | Na | H01M 8/04358 429/434 |
| 2015/0057926 A1* | 2/2015 | Gupta | G08G 1/005 701/500 |
| 2015/0073697 A1* | 3/2015 | Barrett | G01S 19/426 701/409 |
| 2015/0120151 A1* | 4/2015 | Akay | B60R 25/24 701/49 |
| 2015/0145663 A1* | 5/2015 | Moon | G07C 5/008 340/436 |
| 2015/0254987 A1* | 9/2015 | Altintas | G08G 1/20 701/409 |
| 2015/0277942 A1* | 10/2015 | Rork | G06F 8/65 701/31.4 |
| 2016/0023665 A1* | 1/2016 | Sherony | G02B 27/01 701/2 |
| 2016/0144714 A1* | 5/2016 | Kim | B60K 35/00 701/36 |
| 2016/0159339 A1* | 6/2016 | Cho | B60W 10/08 701/22 |
| 2016/0247153 A1* | 8/2016 | Lesesky | G06Q 20/405 |
| 2016/0249181 A1* | 8/2016 | Taniguchi | H04W 4/21 |
| 2016/0280160 A1* | 9/2016 | MacNeille | G05B 15/02 |
| 2016/0305794 A1* | 10/2016 | Horita | G01S 5/16 |
| 2017/0134382 A1* | 5/2017 | Darnell | H04L 12/40 |
| 2017/0174157 A1* | 6/2017 | Deljevic | B60L 11/1861 |
| 2018/0091930 A1* | 3/2018 | Jefferies | H04W 4/80 |
| 2018/0096684 A1 | 4/2018 | Goote et al. | |
| 2018/0137033 A1* | 5/2018 | Ohmert | G07C 5/008 |
| 2018/0137692 A1* | 5/2018 | Ohmert | G07C 5/008 |
| 2018/0141455 A1* | 5/2018 | Jeon | B60L 58/26 |
| 2018/0143635 A1* | 5/2018 | Zijderveld | G05D 1/0221 |
| 2018/0172452 A1* | 6/2018 | Xu | G01C 21/3617 |
| 2018/0189581 A1* | 7/2018 | Turcot | G06K 9/4628 |
| 2018/0203443 A1* | 7/2018 | Newman | B60L 1/00 |
| 2018/0203451 A1* | 7/2018 | Cronin | G05D 1/0088 |
| 2018/0209802 A1* | 7/2018 | Jung | G01C 21/3602 |
| 2018/0226077 A1* | 8/2018 | Choi | B60K 35/00 |
| 2018/0239349 A1* | 8/2018 | Rasmussen | H04L 63/10 |
| 2018/0272878 A1* | 9/2018 | Lee | B60L 53/665 |
| 2018/0275653 A1* | 9/2018 | Endo | G05D 1/0055 |
| 2018/0306598 A1* | 10/2018 | DeCia | G01C 21/3492 |
| 2018/0352376 A1* | 12/2018 | Shuman | H04W 4/40 |
| 2018/0357838 A1* | 12/2018 | Roberts | G07C 5/0841 |
| 2018/0357898 A1* | 12/2018 | Kamini | H04N 5/23293 |
| 2019/0011907 A1* | 1/2019 | Park | G05D 1/0055 |
| 2019/0027137 A1* | 1/2019 | Sohn | G10L 15/22 |
| 2019/0033860 A1* | 1/2019 | Okimoto | G05D 1/0088 |
| 2019/0047514 A1* | 2/2019 | Brombach | B60R 25/2018 |
| 2019/0048647 A1* | 2/2019 | Lickfelt | G07C 9/20 |
| 2019/0143905 A1* | 5/2019 | Cazzoli | G06F 3/04847 348/148 |
| 2019/0164421 A1* | 5/2019 | Lauer | B60H 1/00742 |
| 2019/0176752 A1* | 6/2019 | Cermak | B60R 25/33 |
| 2019/0180740 A1* | 6/2019 | Nandy | G10L 15/30 |
| 2019/0213883 A1* | 7/2019 | Kim | H04B 10/116 |
| 2019/0219413 A1* | 7/2019 | Prakah-Asante | G01C 21/3697 |
| 2019/0237069 A1* | 8/2019 | Zhao | G06F 40/55 |
| 2019/0271550 A1* | 9/2019 | Breed | G08G 1/147 |
| 2019/0311557 A1* | 10/2019 | Rockwell | G06Q 30/0203 |
| 2019/0311713 A1* | 10/2019 | Talwar | G10L 15/1815 |
| 2019/0344753 A1* | 11/2019 | Weber | B60R 25/01 |
| 2020/0005635 A1* | 1/2020 | Nagata | H04N 1/32 |

OTHER PUBLICATIONS

Dillenburg et al., The Intelligent Travel Assistant (Year: 2002).*
Dudkiewicz et al., Smart Services Supporting Drivers in Effective Cars Parking (Year: 2017).*

* cited by examiner

VEHICLE CONTROL MODULE FOR SMART HOME CONTROL SYSTEM

CROSS-REFERENCE TO RELATED APPLICATION

This application claims the benefit under 35 U.S.C. § 119(e) of U.S. Provisional Patent Application No. 62/670,885, filed May 14, 2018, entitled "VEHICLE CONTROL MODULE FOR SMART HOME CONTROL SYSTEM," which is incorporated herein by reference in its entirety.

BACKGROUND OF THE INVENTION

The present invention generally relates to a remote control system of a vehicle, and more particularly, to a vehicle-based remote control system for controlling one or more smart devices located remotely from the vehicle.

SUMMARY OF THE DISCLOSURE

According to one aspect of the present disclosure, a control module for a vehicle is disclosed. The control module comprises a wireless communication circuit in communication with a smart home device and a remote server. The control module further comprises a control circuit in communication with the wireless communication circuit and a controller of the vehicle via a bus interface. The control circuit is configured to receive a status request from the smart home device via the wireless communication circuit. Based on the status request, the control circuit requests a status identification from the controller according to the status request. The control circuit receives the status identification from the controller and communicates the status identification to the smart device via the wireless communication circuit. The status identification is announced by the smart home device.

According to another aspect of the disclosure, a method for communicating a status inquiry of a vehicle is disclosed. The method comprises receiving a status request from the smart home device via the wireless communication circuit and requesting a status identification from a controller of the vehicle according to the status request. The method further comprises receiving the status identification from the controller and communicating the status identification to the smart device via the wireless communication circuit. The status identification may then be indicated by the smart home device.

According to yet another aspect of the disclosure, a control system for a vehicle is disclosed. The system comprises a wireless communication circuit in communication with a smart home device and a remote server and a control circuit in communication with the wireless communication circuit and a controller of the vehicle. The control circuit is in communication with the controller of the vehicle via a bus interface. The control circuit is configured to receive a control request from the smart home device via the wireless communication circuit, the control request comprises an authentication indication and requests an update of a state of at least one system of the vehicle according to the control request. The controller is further configured to receive an identification of the state from the controller in response to the request of the update, and communicate the identification of the state to the smart device via the wireless communication circuit.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The terms "including," "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The disclosure provides for a vehicle-based remote control system configured to control various devices. In various embodiments, the vehicle-based remote control system may be configured to communicate with one or more remote control devices or smart devices. In this way, the remote control system may be configured to communicate with the smart devices to supply vehicle information to the smart devices and/or receive control instructions from the smart devices. For example, the vehicle-based remote control system may be configured to receive a control instruction based on a voice command of a smart device. In response to the instruction, the vehicle-based remote control system may be configured to communicate information to the smart device or control one or more vehicle systems (e.g., an alarm, ignition, door lock, door latch, widow controller, etc.). As an introduction, smart devices that may be utilized to operate with the vehicle-based remote control system are discussed in reference to FIG. 1.

Figure 1:
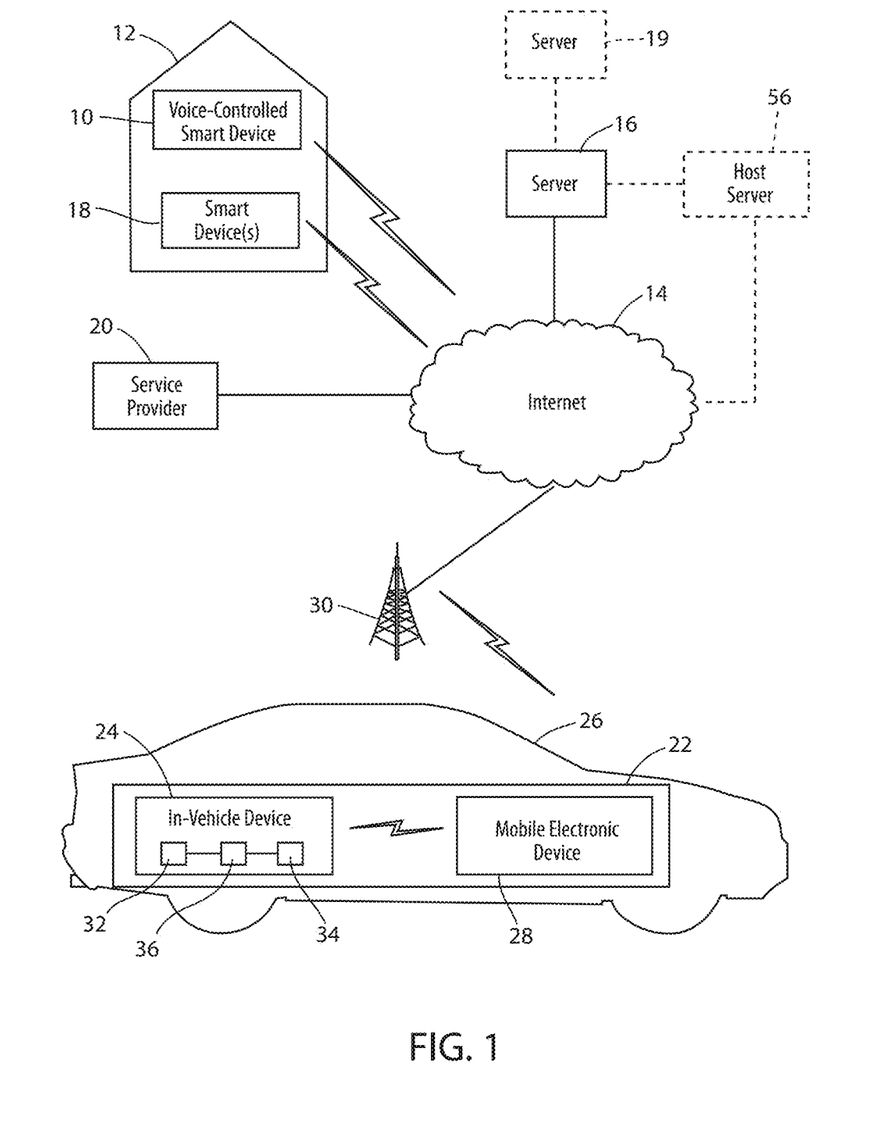
FIG. 1 is a block diagram showing a vehicle-based control system in communication with a server responsive to voice commands according to embodiments of the present invention.

Referring to FIG. 1, a diagram of a voice-controlled smart device 10 is shown located inside a home 12. For purposes of illustration and better understanding, the device 10 may correspond to a Home or Home Mini sold by Google, or an Echo or Echo Dot sold by Amazon. Though specific devices are discussed in reference to the smart device 10, various devices with similar functionality may be implemented in accordance with the disclosure. The smart device 10 may include a built-in microphone and speaker and be utilized as hands-free, voice-controlled devices that use a virtual assistant (e.g., Alexa or Google Assistant). In operation, the device 10 continuously listens for a wake word (e.g., "OK Google" or "Alexa") to be spoken by a user.

Once the user says the wake word, the device 10 recognizes that the wake word has been said and begins recording a user voice command. Once the user has finished speaking, device 10 sends the recording over the internet 14 to a server 16, such as Google Services or Alexa Voice Services (AVS). The server 16 may correspond to a cloud-based service operated by Google, Amazon, or other providers. The server 16 processes the recording and generates a command sent over the internet 14 to device 10. The device 10 receives the command and implements a task consistent with the user voice command originally spoken by the user. For example, if the user said "Alexa, what is the weather today?", Alexa may respond via the speaker in the smart device 10 with a general forecast related to the geographical area of the user.

In other instances, device 10 may be linked to one or more compatible smart devices 18, such as any of those produced by Samsung SmartThings®, Wink, Insteon®, Nest®, Philips Hue, Wemo®, Ecobee®, for example. Once the devices 18 are linked to device 10, the server 16 may be able to generate commands for controlling one or more of the devices 18 in response to a complimentary user voice command recording(s). For example, when server 16 receives a user voice command related to the control of a linked device, such as one of devices 18, the server 16 may parse the user voice command before sending it to another server 19 in charge of the linked device. That server 19 would, in turn, generate a command in accordance with the user voice command. Alternatively, it is contemplated that server 16 may generate a command for directly controlling the linked device, if such functionality permits.

Accordingly, the smart device 10 may enable a user to not only request information on demand, but also automate various home features in response to a user voice command. Such features may include lights, thermostats, speakers, sprinklers, fans, and televisions, for example. In addition, device 10 may be configured such that a user voice command results in the server 16 generating a command that is transmitted over the internet 14 to a web-based service provider 20 for prompting the same to render a service. For example, the smart device 10 may be operable to generate computerized orders for a user to order food from restaurants or items through online shopping providers (e.g., pizza from Domino's pizza, merchandise from Amazon, or a shuttle vehicle from Uber).

Figure 2:
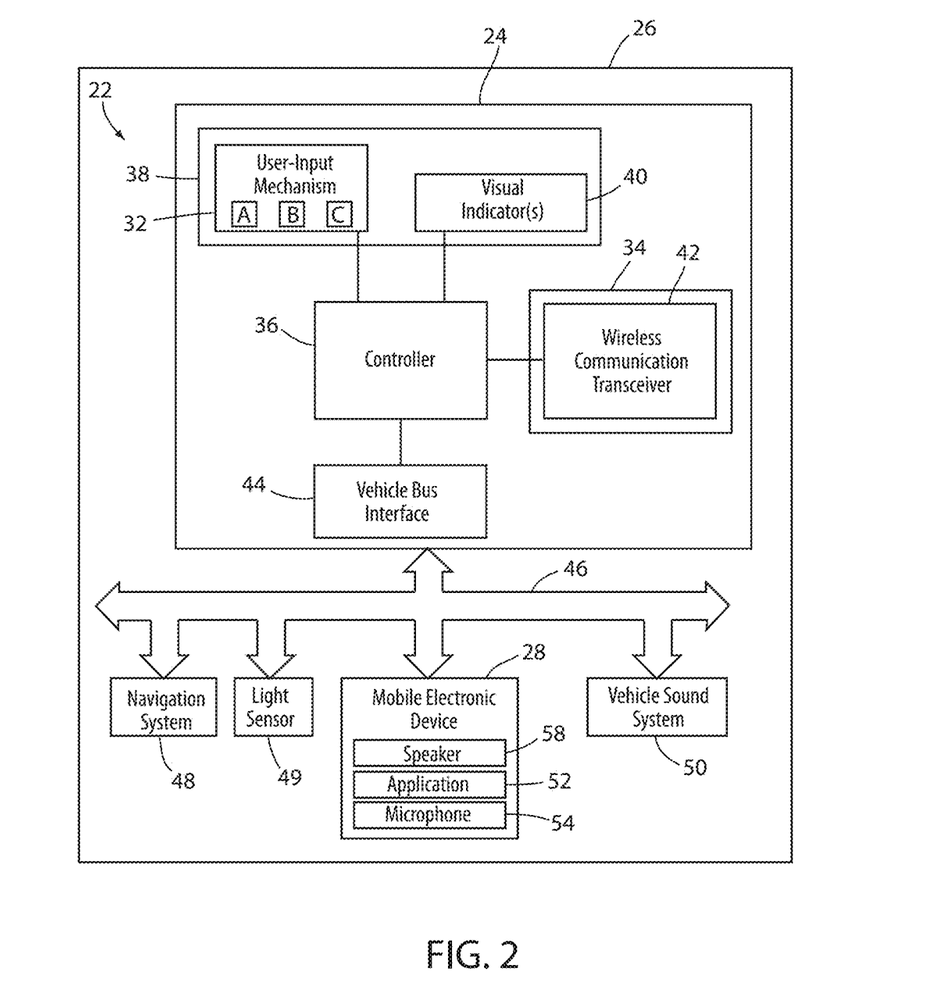
FIG. 2 is a block diagram showing the vehicle-based control system in greater detail.

Referring now to FIGS. 1 and 2, a vehicle-based remote control system 22 is shown according to embodiments of the present invention. As described herein, the remote control system 22 may be configured to communicate with the server 16. In this configuration, the remote control system 22 may be operable to enable a user, typically a vehicle occupant (e.g., the driver), to remotely control the smart device 10 and/or devices 18 linked thereto. The remote control system 22 may include a first device and/or a second device. The first device may correspond to a dedicated user interface for a control module 24, which may be incorporated in a vehicle 26. The second device may correspond to a mobile electronic device 28, generally located inside a vehicle 26. In various embodiments, the control module 24 of the remote control system 22 may be configured to work in coordination with the smart device 10 to communicate with and control various systems of the vehicle 26.

Figure 4:
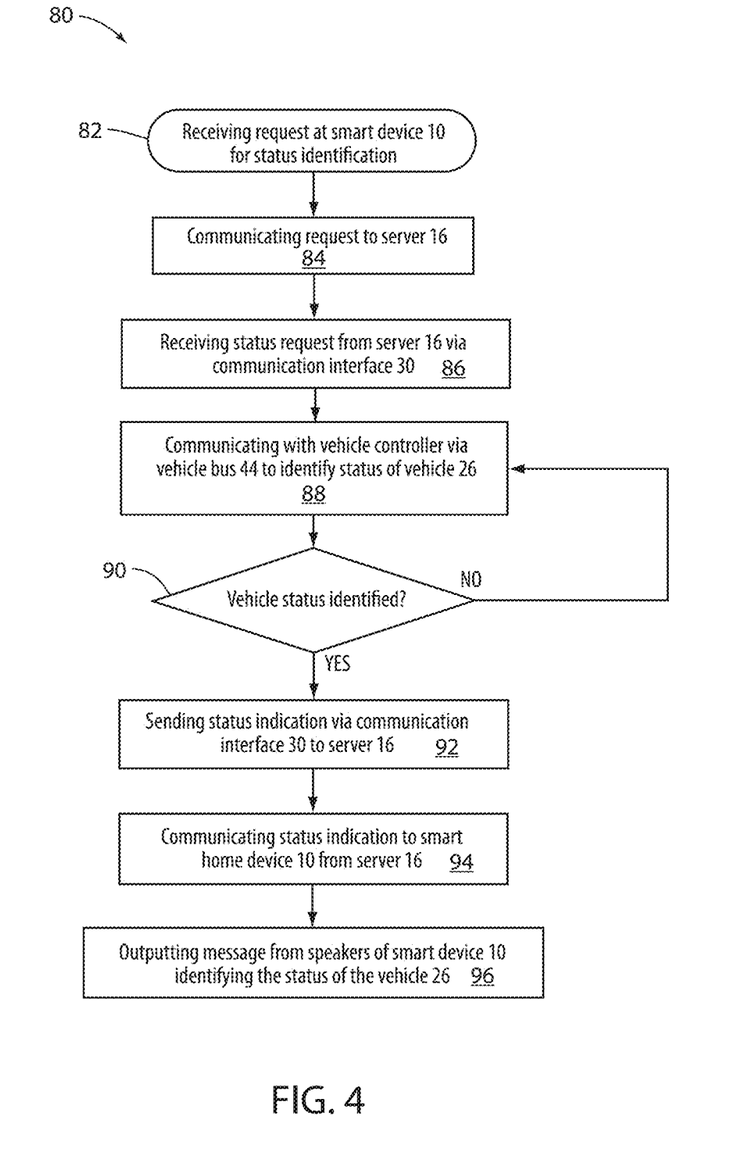
FIG. 4 is a flow diagram of a method for a control module of a vehicle configured to communicate a status message to a smart home system.
Figure 5:
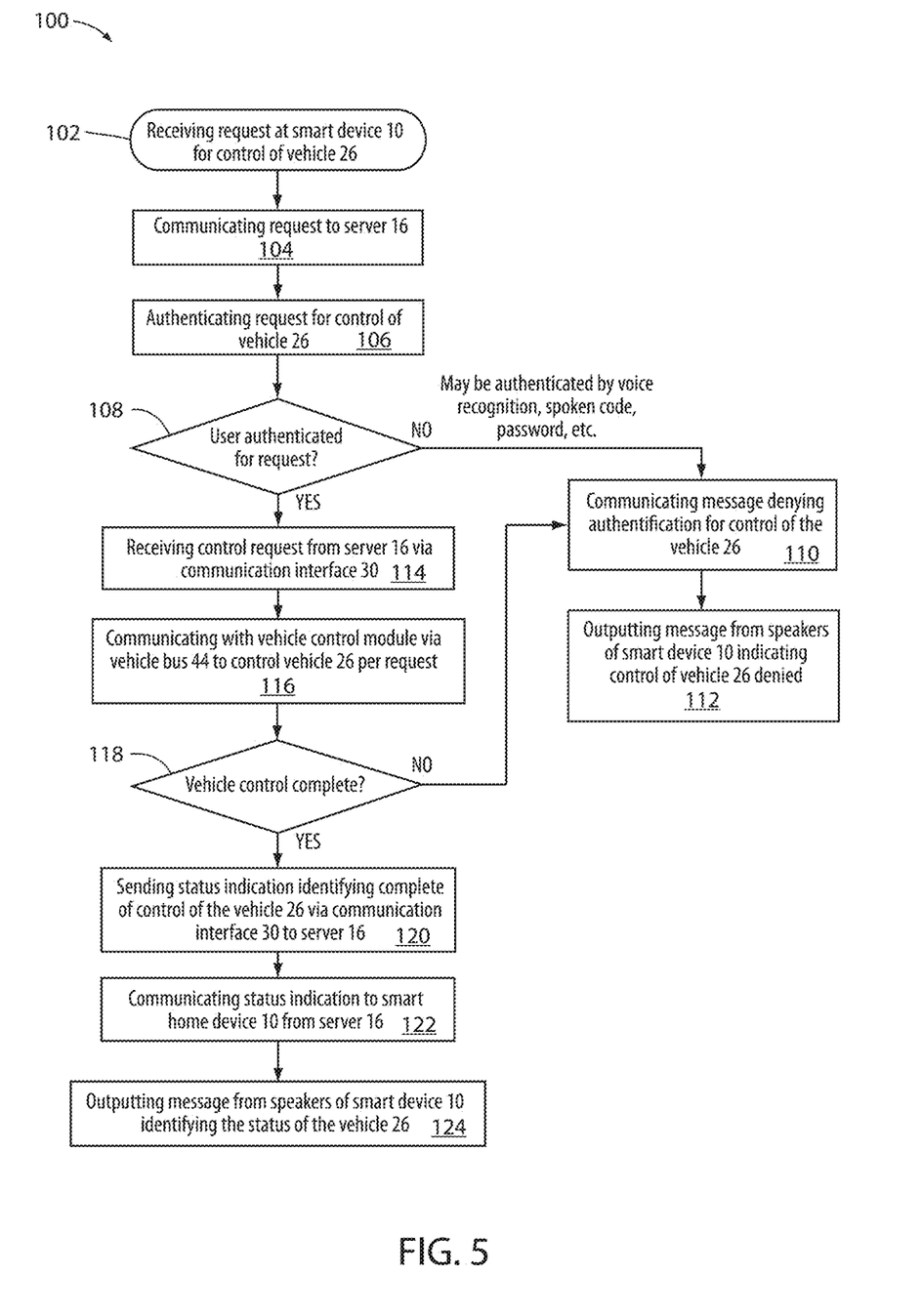
FIG. 5 is a flow diagram of a method for a control module of a vehicle configured to control a vehicle system or accessory in accordance with the disclosure.

As further discussed in reference to FIGS. 4 and 5, in this configuration, the control module 24 may be configured to communicate vehicle information to the smart device 10 and/or receive control instructions from the smart device 10. For example, the vehicle-based remote control system 22 may be configured to receive a control instruction based on a voice command of a smart device 10. In response to the instruction, the vehicle-based remote control system 22 may be configured to communicate information to the smart device 10 or control one or more vehicle systems (e.g., an alarm, ignition, door lock, door latch, widow controller, etc.). As an introduction, smart devices that may be utilized to operate with the vehicle-based remote control system 22 are discussed in reference to FIG. 1.

The control module 24 may include a user-input mechanism 32, an interface 34 configured to communicate with the mobile electronic device 28, and a controller 36 coupled to the user-input mechanism 32 and the interface 34. The user-input mechanism 32 may include one or more actuatable members, exemplarily shown as buttons A, B, and C. While three buttons are shown, it is to be understood that more or less buttons may be provided, if desired. Alternatively, the actuatable members may be embodied as toggle switches, capacitive sensors, optical sensors, or any other component capable of registering user actuation. The user-input mechanism 32 may be associated with a user interface 38 that also includes one or more visual indicators 40 for providing feedback in response to actuation of the user-input mechanism 32.

The interface 34 may include a wireless communication transceiver 42 for enabling the controller 36 to wirelessly communicate with the mobile electronic device 28. For example, the wireless communication transceiver 42 may be configured such that communication between the controller 36 and the mobile electronic device 28 occurs via Bluetooth®, Bluetooth® Low Energy, Wi-Fi®, or any other known wireless communication protocol. Additionally or alternatively, the interface 34 may include a vehicle bus interface 44 connected to a vehicle bus 44 for enabling the controller 36 to communicate with the mobile electronic device 28 via a USB connection or other known wired connection. The vehicle bus 44 may also connect to various vehicle equipment including, for example, a vehicle navigation system 48 (e.g. GPS Navigation), a light sensor 49, and a vehicle sound system 50. The vehicle bus 44 may further be in communication with additional vehicle control systems including, but not limited to, a security system, ignition system, fuel level indicator, door lock, door latch, widow controller, etc.

In some embodiments, the control module 24 may be in communication with a vehicle controller via the vehicle bus 46. In this configuration, the control module 24 may be configured to communicate with the control module 24 to identify various status conditions of the vehicle 26. In this configuration, the control module 24 may be configured to identify one or more vehicle status conditions (e.g., an engine warning, oil warning, maintenance schedule, tire pressure indication, airbag operation warning, or any other status indications identifiable by the vehicle controller). In such configurations, a user may request a status update via the voice-controlled smart device 10 by stating, "OK Google, provide a status for vehicle 1." In response to the request, the smart device 10 may transmit the instruction to the server 16, which may identify an instruction and communicate with the control module 24 of the vehicle via a wireless communication interface 30. The wireless communication interface 30 may include various communication protocols compatible with a wireless transceiver of the remote control system 22 which may include but are not limited to WiFi (802.11 series—802.11g, 802.11b, 802.11a, 802.11n, etc.), Bluetooth®, Ultra-wideband (UWB), Zig-Bee®, cellular communications (3G, 4G, LTE), etc.

In response to the request for the status of the vehicle 26, the control module 24 may communicate with the vehicle controller via a communication bus to identify whether a status indication (e.g., maintenance, low fuel, tire pressure, check engine, active, inactive, etc.) exists for the vehicle 26. The control module 24 may then communicate the status of the vehicle 26 to the voice-controlled smart device 10 via the communication interface 30. Based on the status communicated by the control module 24, the voice-controlled smart device 10 may announce the status of vehicle 1. For example, the smart device 10 may output an audible indication announcing the vehicle status or warning status for the vehicle 26. For example, a preconfigured or computer generated voice may announce via the speakers of the smart device 10: "Vehicle 1 is inactive and does not have any status indications," "vehicle is inactive and indicates that the fuel level is low," "vehicle is active and requires an oil change," etc. In this way, the remote control system 22 may be configured to communicate a condition of the vehicle 26 to the voice-controlled smart device 10 in response to a user request.

In some embodiments, the control module 24 may further be configured to provide an identification of a heading and/or location of the vehicle 26. For example, a user of the smart device 10 may request a location update for the vehicle 26 by saying, "smart device, wherein is vehicle 1?" In response to the request, the smart device 10 may communicate the request to the control module 24. In response to the request, the control module 24 may communicate with a location device (e.g. the navigation system 48) to identify a current location of the vehicle 26. Once the location is identified, the control module 24 may communicate the location back to the smart device 10. The location of the vehicle 26 may be announced via the speaker of the smart device 10 by announcing a corresponding address or nearby landmark. For example, based on the GPS location of the vehicle 26, a nearby landmark may be identified by the server 16 and the smart home device 10 may output the location of the vehicle relative to the landmark. For example, the smart device 10 may output: "vehicle 1 is parked near store A in City B," or "vehicle 1 is driving in direction A (e.g. north) near store C on Street D in City F." In this way, the control module 24 may provide the smart home device 10 with information identifying the location of the vehicle 26 such that the smart home device 10 can announce the information to an authorized user.

As discussed herein, the second device may correspond to the mobile electronic device 28, which may be utilized in combination with the control module 24 to communicate information to and from the communication interface 30. In some embodiments, the mobile electronic device 28 may be a smartphone, tablet, or the like, or may, alternatively, be a dedicated device integrated with the vehicle or portable in nature. In this configuration, the control module 24 may communicate with the mobile electronic device 28 via a wired or wireless communication interface 30 as discussed herein. The control module 24 may be integrated within the vehicle 26 and may receive power from the vehicle battery and/or vehicle ignition. The control module 24 may be one of several HOMELINK® devices available from Gentex Corporation of Zeeland, Mich. Such devices may, for example, be integrated with a rearview mirror assembly, a sun visor, or a vehicle console such as an overhead console.

Figure 3:
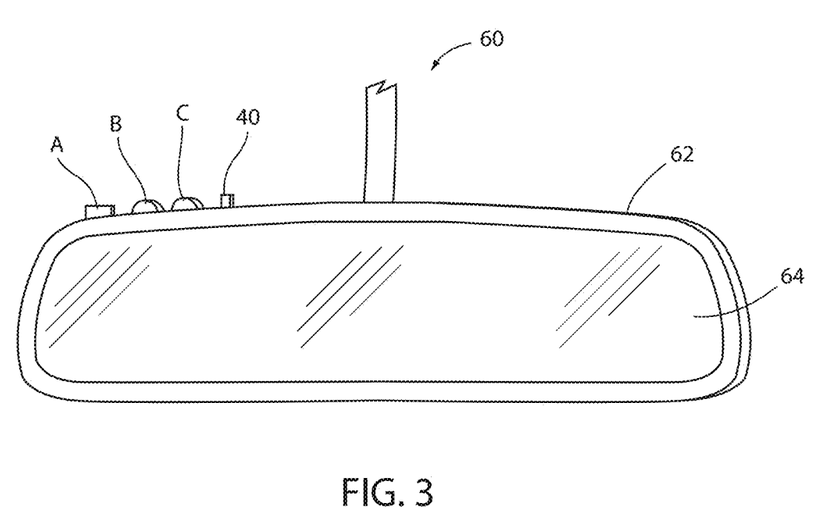
FIG. 3 is a front perspective view of a rearview mirror assembly incorporating an in-vehicle device of the vehicle-based control system.

Referring now to FIG. 3, an example of a vehicle accessory in the form of a rearview mirror assembly 60 is shown. In some embodiments, the control module 24 may be incorporated in the mirror assembly 60. Although shown in the rearview mirror assembly 60, it is to be understood that the control module 24 could be incorporated into various other vehicle accessories or locations within the vehicle 26. As shown in FIG. 3, the rearview mirror assembly 60 may include a housing 62 for mounting to the vehicle 26, and a rearview device 64 such as a rearview mirror element, a rearview display, or combination thereof. For purposes of illustration, buttons A, B, and C of the user-input mechanism 32 are exemplarily located proximate a top corner portion of the housing 62 along with visual indicator 40. In alternative embodiments, buttons A, B, and C may be elsewhere located, such as, for example, on a front fascia of the rearview mirror assembly 60. In yet other alternative embodiments, buttons A, B, and C may be provided in vehicle equipment such as, but not limited to, a center console, an overhead console, and the like. Visual indicator 40 may be operated to provide visual feedback in response to an executed command and may take the form of an LED indicator light capable of illuminating in one or more colors.

Referring now to FIG. 4, a flow chart describing a method 80 for accessing a status identification of the vehicle 26 is shown. The method may begin by receiving a request at the smart device 10 for a status identification (82). The smart device 10 may then communicate the status identification request to the server 16 (84). The control module 24 may then receive the status request from the server 16 via the communication interface 30 (86). In response to receiving the status request, the control module 24 may communicate with the vehicle controller via the vehicle bus interface 44 to identify status of vehicle 26 (88).

As previously discussed herein, the vehicle status may correspond to an engine warning, oil warning, maintenance schedule, tire pressure indication, airbag operation warning, or any other status indications identifiable by the vehicle controller. Additionally, the status identification may correspond to a security system status, ignition system status, fuel level indication, door lock status, door latch status, widow position status, etc. In some embodiments, the request for the status identification may be specifically directed to any of these indications. Such a status identification may be prompted by a specific request to the smart device 10. For example, in response to, "smart device, what is the fuel level of vehicle 1?", the smart device may request an indication of the vehicle status in the form of the fuel level of the vehicle 26. Accordingly, in step 88, the control module 24 may communicate with the vehicle controller via the vehicle bus interface 44 to identify the fuel level of vehicle 1.

If the vehicle status is identified in step 90, the control module 24 may continue to send the status indication to the server 16 via the communication interface 30 (92). If the vehicle status is not identified in step 90, the control module 24 may continue to communicate with the vehicle controller until an error state is entered after repeated failures. The error state may be communicated to the smart device 10 via the communication interface 30 or may be identified by the smart device 10 after a timeout period has expired. Following step 92, the status identification of the vehicle 26 may be communicated from the server 16 back to the voice-controlled smart device 10 (94). The voice-controlled smart device 10 may then output a message identifying the status communicated in the status identification for the vehicle 26 (96). In reference to FIG. 5, a similar method is described that also provides for an authentication procedure. Such an authentication procedure may similarly be applied to the method 80 in accordance with the disclosure.

Referring now to FIG. 5, a flow chart for a control method 100 configured to control a vehicle system is shown. Similar to the method, 80, the method 100 may begin by receiving a request at the smart device 10 (102). However, the request in the method 100 may be in order to control a system or accessory of the vehicle 26. Upon receiving the request, the smart device 10 may communicate the vehicle control request to the server 16 (104). Once the request is received, the server 16 may authenticate the request for control of the vehicle 26 (106). The authentication may ensure that the user requesting control of the vehicle 26 is authorized to control the vehicle 26 as requested. The user may be authenticated via voice recognition, a spoken code or code word, or various combinations of voice authentication with specific codes or passwords, which may be prompted by the smart device 10.

If the request to control the vehicle 26 is not authenticated in step 108, the server 16 may communicate a message denying authentication for the user to control the vehicle 26 to the smart device 10 (110). The smart device 10 may then output a message from the speakers indicating that the control of the vehicle 26 is denied (112). If the request to control the vehicle 26 is authenticated in step 108, the server 16 may communicate the control request to the control module 24 via the communication interface 30 (114). In response to receiving the control request, the control module 24 may communicate with the vehicle controller via the vehicle bus interface 44 to control the system or accessory of the vehicle 26 as requested (116). The control module 24 may then continue to verify whether or not the control request for the vehicle 26 is completed in step 118.

If the vehicle control request is not completed, the control module 24 may continue to step 110. If the vehicle control request is successfully completed, the control module 24 may communicate a status signal identifying the completion of the control of the vehicle 26 to the server 16 via the communication interface (120). The server 16 may then communicate the status indication of the vehicle control request to the smart device 10 (122). In response to receiving the status indication, the smart device 10 may be configured to output a message from the speakers identifying the status of the control instruction for the vehicle 26 as being complete (124).

The vehicle control instruction as discussed herein may correspond to various forms of requests to control various vehicle systems and accessories. For example, the control may be configured to the following exemplary vehicle systems without limitation: an ignition system, a lighting system, a horn or alarm system, a door lock system, one or more automated or power doors, a climate control or heating system, a defrost system, etc. Additionally, a single command may be configured to control more than one of the vehicles systems or accessories. For example, "smart home, prepare vehicle 1," may activate an ignition of the vehicle 26, activate the climate control to heat or cool the vehicle, and/or activate a defrost function. The settings may be configured seasonally and stored based on one or more preferences of a user of the system 22.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the Doctrine of Equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It will be understood that any described processes, or steps within described processes, may be combined with other disclosed processes or steps to produce systems and methods within the scope of the present disclosure. The exemplary system and method disclosed herein are for illustrative purposes and are not to be construed as limiting.

It is also to be understood that variations and modifications can be made on the aforementioned system and method without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A remote control module for a vehicle comprising:
a wireless communication circuit in communication with a smart home device located inside a home and a remote server; and
a control circuit in communication with the wireless communication circuit and a controller of the vehicle via a vehicle bus interface, wherein the control circuit is configured to:
receive a status request for a location of the vehicle from the smart home device via the wireless communication circuit;
detect an operating status of the vehicle in response to the status request for the location;
identify a driving condition of the vehicle indicating whether the vehicle is driving or parked based on the operating status;
identify the location of the vehicle via a location detection system of the vehicle in response to the status request for the location;
and
communicate a status identification comprising the driving condition and the location of the vehicle to the remote server via the wireless communication circuit, wherein the remote server identifies a landmark nearby the vehicle based on the location of the vehicle and communicates the status identification including the landmark nearby the vehicle to the smart home device, and wherein the driving condition and the location of the vehicle in relation to the landmark are announced by the smart home device.

2. The control module according to claim 1, wherein the control circuit is further configured to receive a control request comprising a vehicle control instruction for the vehicle in communication with the wireless communication circuit.

3. The control module according to claim 2, wherein the control request comprises at least one of a climate control instruction and a defrost instruction.

4. The control module according to claim 2, wherein the control circuit is further configured to:
   receive from the remote server the control request comprising an authentication indication from the smart home device via the wireless communication circuit to control a vehicle function.

5. The control module according to claim 4, wherein the control circuit is further configured to:
   communicate the control request to the controller of the vehicle; and
   communicate a confirmation of the control request to the smart home device using the wireless communication circuit via the remote server.

6. The control module according to claim 1, wherein the control circuit is further configured to:
   in response to the driving condition indicating that the vehicle is driving, identify a heading direction of the vehicle;
   communicate the heading direction and the location of the vehicle to the remote server; and
   wherein a voice announcement by the smart home device identifies the heading direction and the landmark in response to the status request.

7. A method for communicating a status request of a vehicle, the method comprising:
   receiving, by a control circuit of a remote control module associated with the vehicle, the status request for a location of the vehicle from a smart home device located inside a home via a wireless communication circuit of the remote control module in communication with the control circuit;
   detecting, by the control circuit via a controller of the vehicle in communication with the control circuit, an operating status of the vehicle in response to the status request for the location;
   identifying, by the control circuit, a driving condition indicating whether the vehicle is driving or parked based on the operating status;
   identifying, by the control circuit, the location of the vehicle via a location detection system of the vehicle in response to the status request for the location;
   and
   communicate, by the control circuit, a status identification comprising the driving condition and the location of the vehicle to a remote server via the wireless communication circuit, wherein the remote server identifies a landmark nearby the vehicle based on the location of the vehicle and communicates the status identification including the landmark nearby the vehicle to the smart home device, and wherein the driving condition and the location of the vehicle in relation to the landmark are announced by the smart home device.

8. The method according to claim 7, further comprising:
   applying an authentication routine authenticating a control request to control a vehicle function of the vehicle from the smart home device, wherein the authentication routine is applied by the remote server; and
   receiving the control request comprising an authentication indication from the remote server received by the control circuit via the wireless communication circuit.

9. The method according to claim 8, further comprising:
   communicating, by the control circuit, the control request to the controller of the vehicle; and
   communicating, by the control circuit, a confirmation of the control request to the smart home device using the wireless communication circuit via the remote server.

10. The method according to claim 7, further comprising:
    in response to the driving condition indicating that the vehicle is driving, identifying by the control circuit, a heading direction of the vehicle;
    communicating, by the control circuit, the heading direction and the location of the vehicle to the remote server; and wherein a voice announcement by the smart home device identifies the heading direction and the landmark in response to the status request.

* * * * *